(12) United States Patent
Kongstad

(10) Patent No.: US 6,960,014 B2
(45) Date of Patent: Nov. 1, 2005

(54) TEMPERING APPARATUS

(75) Inventor: Anders Conradsen Kongstad, Copenhagen (DK)

(73) Assignee: Aasted-Mikroverk APS, Farum (DK)

( * ) Notice: Subject to any disclaimer, the term of this patent is extended or adjusted under 35 U.S.C. 154(b) by 295 days.

(21) Appl. No.: 10/418,118

(22) Filed: Apr. 18, 2003

(65) Prior Publication Data

US 2004/0081017 A1 Apr. 29, 2004

(30) Foreign Application Priority Data

Apr. 22, 2002 (EP) .............................. 02076586

(51) Int. Cl.[7] .............................. A23C 3/00; B01F 7/20
(52) U.S. Cl. .................... 366/147; 366/329.1; 366/314; 99/455; 99/466
(58) Field of Search ................................ 366/314, 144, 366/147, 270, 325.4, 329.1; 99/455, 466, 348

(56) References Cited

U.S. PATENT DOCUMENTS

| | | | | |
|---|---|---|---|---|
| 455,246 A | * | 6/1891 | Clifford | 366/149 |
| 570,662 A | * | 11/1896 | Cormack | 366/325.4 |
| 2,009,957 A | * | 7/1935 | Esch | 366/325.4 |
| 2,538,466 A | * | 1/1951 | Marco | 366/147 |
| 4,067,553 A | * | 1/1978 | Yamaoka | 366/147 |
| 4,310,124 A | * | 1/1982 | Schwing et al. | 366/329.1 |
| 4,859,483 A | * | 8/1989 | Sollich | 426/519 |
| 4,892,033 A | * | 1/1990 | Sollich | 99/455 |
| 4,998,464 A | * | 3/1991 | Kubacki | 99/455 |
| 5,514,390 A | * | 5/1996 | Aasted | 426/519 |
| 5,525,364 A | * | 6/1996 | Haslund | 426/519 |
| 5,850,782 A | * | 12/1998 | Aasted | 99/455 |
| 5,899,562 A | * | 5/1999 | Aasted | 99/455 |
| 6,065,395 A | * | 5/2000 | Sollich | 99/455 |
| 6,105,489 A | * | 8/2000 | Haslund | 99/455 |
| 6,152,019 A | * | 11/2000 | Heyde | 99/455 |
| 6,164,195 A | * | 12/2000 | Haslund | 99/455 |

FOREIGN PATENT DOCUMENTS

| | | |
|---|---|---|
| EP | 0 289 849 A2 | 11/1988 |
| EP | 0 806 148 A2 | 11/1997 |
| EP | 0 806 149 A2 | 11/1997 |
| EP | 1 004 244 A1 | 5/2000 |
| EP | 1 175 837 A2 | 1/2002 |
| JP | 11276084 | 10/1999 |
| WO | WO92/00015 | 1/1992 |

* cited by examiner

Primary Examiner—Tony G. Soohoo
(74) Attorney, Agent, or Firm—Finnegan, Henderson, Farabow, Garrett & Dunner, L.L.P.

(57) ABSTRACT

Tempering apparatus having disc-free stirring tool (8) with plate-shaped arms (12, 13). The upper side (14) of each arm (12) has a different geometrical configuration than the lower side (19) thereof. Each neighbouring arm (13) has the opposite configuration of the upper and lower sides (23 and 24). The mass is thereby given an intermittent up- and downwards movement in the mass treatment chamber (2) and the tempering capacity of the apparatus is improved.

30 Claims, 5 Drawing Sheets

TEMPERING APPARATUS

Figure 1:
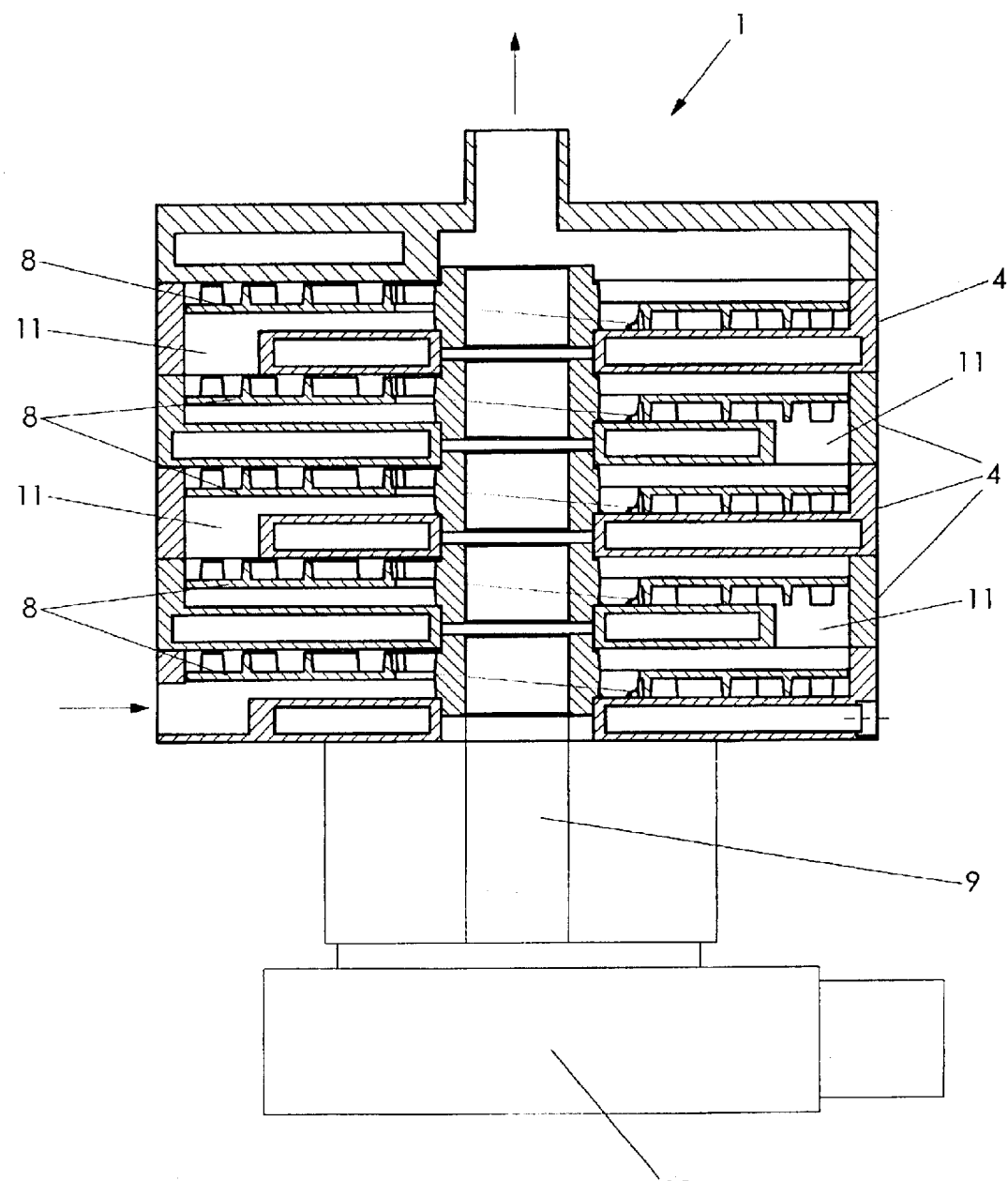

The present invention concerns the technical field of apparatuses for tempering of fat-containing mass, for example chocolate-like mass or chocolate mass comprising cocoa butter.

The apparatuses comprises at least one mass treatment chamber comprising a stirring tool arranged therein, which is being driven by a central shaft, and which stirring tool comprises radially extending, plate shaped arms having mixing obstacles.

By the tempering process the mass is brought to around 40–50° C., whereafter it is being cooled to around 25–34° C. so that crystallisation is initiated. Then the mass is reheated around 0.5–2.0° C. for re-melting most of the in-stable crystals in the mass, however preserving a content of stable β-crystals which melts at a higher temperature than the in-stable crystals. The stable crystals are preserved in the mass ready for depositing in an amount of typically 0.01%–5%, preferably in an amount of 0.1%–2%.

Generally, fat-containing masses are suspensions of non-fat particles such as sugar, milk powders and cocoa solids mixed up with a liquid fat constituent. When it comes to chocolate mass, the fat phase comprises genuine cocoa butter of until around 30%, but may comprise substitutes as well when we are talking about chocolate-like masses. Such substitutes can be in the form of other types of fat-containing oils. Chocolate types where the cocoa butter has been replaced wholly or partly by other fats are often named commercially as compound chocolate, in which the cocoa butter has been replaced by palm-kernel oil. Mass made of 100% fat in the form of cocoa butter or the like as compound is also possible.

However, for the tempering to be performed, it is decisive, that whether the fat phase constitutes of genuine cocoa butter or substitutes therefore, that the fat phase is capable of crystallizing into stable crystal types, such as the β-crystals developing in genuine cocoa butter when the mass solidifies.

The chocolate-like mass is brought to a tempered, liquid state and then deposited in moulds, on top of the pre-made articles or for covering the upper open surfaces of the articles.

An apparatus of the introductory kind for tempering chocolate mass was invented by Aasted in 1945, The apparatus has a plurality of mass treatment chambers arranged in a column with intermediary water chambers connected to a circuit, in which the temperature of the water could be regulated before entering the water chambers. The stirring tools comprised two plate shaped arms having the same identical configuration of the upper and lower sides of the blades. All the mixing blades had the same shape and configuration and was arranged in identical patterns on both sides of the arms.

EP 0 289 849 A2 (SOLLICH) discloses another apparatus of the above kind by which the stirring tool comprises four plate-shaped arms arranged in a cross. The geometrical configurations on each side of the arms were identical. The width of the arms were the same at the centre where the arms are connected to the shaft, as at the ends of the arms at the periphery of the mass treatment chamber. Tests revealed, that the arms had a very high drag coefficient in the mass and to a severe extent dragged the mass around in the chamber in comparison with a stirring tool having only two arms. The mixing of the mass is only performed in two dimensions, i.e. over the planar heat-exchange surface of the chamber.

EP 0806149 A2 (AASTED) describes a further tempering apparatus of the introductory type, by which the stirring tool comprises two arms having identical geometrical configurations on each sides. The drag in the mass is reduced severely as the arms are tapered towards the ends. The much higher velocity of the ends of the arms in comparison with the velocity at the centre is thereby taken into account or balanced with a view of severely reducing the drag resistance in the mass. The arms are provided with openings at the centre for providing axial flow at the centre zone, however the mixing of the mass at the far major remaining part of the mass chamber is performed in two dimensions only.

The prior art is silent about any hints or pointers to solutions, which could guide the skilled person in the direction of a solution which mixes the mass thoroughly by vertical movements GB 644,312 (ATLAS) discloses in 1950 a further apparatus for tempering of the above described type, however, the stirring tools are laid out as discs separating the mass treatment chambers in lower and upper chamber parts. The mass enters a chamber through a central ring-shaped gap extending around the shaft, and runs radially out towards the periphery in the lower chamber part. The mass passes through a ring-shaped gap between the periphery of the disc and the peripheral wall of the mass chamber and runs further on in the upper chamber part in towards an upper ring-shaped gap at the shaft through which the mass leaves the chamber and enters the next following chamber. The two sides of the discs are provided with mixing obstructions.

EP 1 004 244 A1 (SOLLICH) discloses a further chocolate tempering apparatus like the one described in the above referred GB 644,312, the only difference seems to be details such as the design of the mixing obstacles. However, the mixing of the mass only gives movements in two dimensions, i.e. in the planar extension of the slim mixing chamber gap between the surfaces of the mixing disc and the adjacent upper or lower surface of the mass chamber. The apparatus having disc shaped mixing tools are impossible to drain out completely from chocolate mass when required, for example when another chocolate type is to be tempered through the apparatus, i.e. when dark chocolate is to be drained out before white chocolate is to be tempered. The problem escalates when the mass to be drained out is of a high viscous type, such as nougat or crème-fillings. The mass simply covers or glues to the disc surfaces especially when they are provided with so many mixing obstacles or knobs as disclosed in the EP publication, i.e. between 24 and 36 knobs on each side of the discs.

The tempering capacity of a tempering apparatus is defined as the maximal capability in kilograms pro hour to temper a fat-containing mass having a predetermined content of for example 5% of a desired type, stable β-crystals, such as the βV-crystals. When comparising the tempering capacity of two different apparatuses it is then important, that the content of the tempered masses are as identical as possible.

The large surfaces of the mixing discs in comparison with the surfaces of mixing arms are suspected to be capable of achieving slightly higher tempering capacity when working on the same heat exchange surface area. However, concomitant disadvantages with the discs are the severe flow resistance exhibited to the mass in comparison with the arms as well as lack of possibility of high mixing intensity of the mass.

Consequently, a high flow resistance and therefore contra pressure against the mass in the apparatus having discs require a much more forceful pump to press the mass through than by the apparatus having stirring tools with arms. The high flow resistance makes it in fact impossible to completely empty the apparatus with discs from mass. Neither does the discs give any contribution to the movement of the mass through the apparatus as the stirring tools having arms does. The mass pump therefore has to be much more forceful and then expensive for an apparatus having discs than for one having stirring arms.

The other problem with the discs is the partitioning of the mass chambers in two parts which completely excludes any vertical mass flow in the mass chamber and certainly makes intermixing of mass from the one partitioning with mass in the other partitioning of the chamber impossible. Especially in the crystals creating zone or area where crystals are created with high intensity on the heat exchange surfaces, the crystals have to be removed fast and be mixed and distributed quickly and homogenously into the remaining mass in the chamber.

The objective problem to solve is to provide a tempering apparatus, which is free from discs and therefore capable of being drained empty from mass and especially from highly viscous mass, however which exhibits a high tempering capacity as well.

The apparatus according to the invention comprises a stirring tool which has radially extending, plate shaped arms with mixing obstacles, and the upper side of each plate shaped arm has different geometrical configuration than the lower side thereof, and neighbouring plate-shaped arms has opposite configurations of the upper and the lower sides.

The mass is moved vertically up and down in the chamber in an intermittent sequence. The movements works simultaneously with the mixing provided by the mixing obstacles. The intermittent sequence of the vertically directed up- and downwardly directed flow of the mass effectively distributes the cold or heat from the heat exchange surfaces into the mass.

Tests have revealed an improvement of astonishing 30–60% in tempering capacity for the inventive solution in comparison with the traditional stirring tools with plate-shaped arms—and yet may the new apparatus be completely emptied from any mass and especially from highly viscous mass. The improvement depended upon the type of mass tempered, however for traditional and widely used milk-chocolate types the average improvement was around 50%. The new stirring tool was furthermore tested in comparison with discs of the previously describes type. The tests revealed improvements in tempering capacity in comparison with the discs as well. Astonishingly, the improvements was between 10–30% in tempering capacity.

By different geometrical configuration is meant, that the shape of the one side of an arm secures a severely lower drag resistance or flow resistance through the mass, than the shape of the other side of the arm. If mixing obstacles are provided on both sides of the arms the number of obstacles at the one side of the arm shall be much lesser than at the other side. At the one side may for example be arranged two obstacles and at the other side may be arranged 4–10 obstacles. The obstacles could for example be essentially identical mixing blades at both sides of the arm or identical mixing knobs at both sides of the arm. The drag resistance may also be reduces severely if the shape or configuration of the obstacles at the one side is altered, for example by reducing the width of the obstacles drastically in comparison with the width of the obstacles at the other side of the arms. Optional is when the one side is essentially free from mixing obstacles and the other side comprises 3–6 mixing obstacles Decisive for obtaining different geometrical configuration of the two sides of the arms is then that a different resistance in the mass flow is achieved. A pressure difference between the two sides is then created and the mass is influenced to the intermittent up-and down movements behind the trailing edge of an arm.

In conclusion the inventive apparatus comprises a stirring tool which is free from a disc, as it only comprises mixing arms, however it achieves the same high tempering capacity.

To the contrary from the prior known disc-free tempering apparatuses the inventive solution provides movement and mixing of the mass not only in two dimensions, however in a third essentially vertical dimension as well. Furthermore, the movements influenced to the mass are intermittent or periodical. Due to the severe improvement in tempering capacity of around 50%, around a third of the mass treatment chambers can be omitted in comparison with a traditional tempering apparatus having arms as stirring tools and if the same tempering capacity in kilos shall be available.

A thru 3-dimensional mixing pattern of the mass horizontally as well as vertically is achieved, when the all the obstacles at one side of an arm are projecting mixing blades, which are inclined so that the mass is forced radially out towards the periphery or radially in towards the centre. The frequency with which a specific area is swept by a revolving arm was then successfully increased with approximately 50% and the tempering capacity was even further improved.

The invention is further described by referral to the drawing, in which

Figure 2:
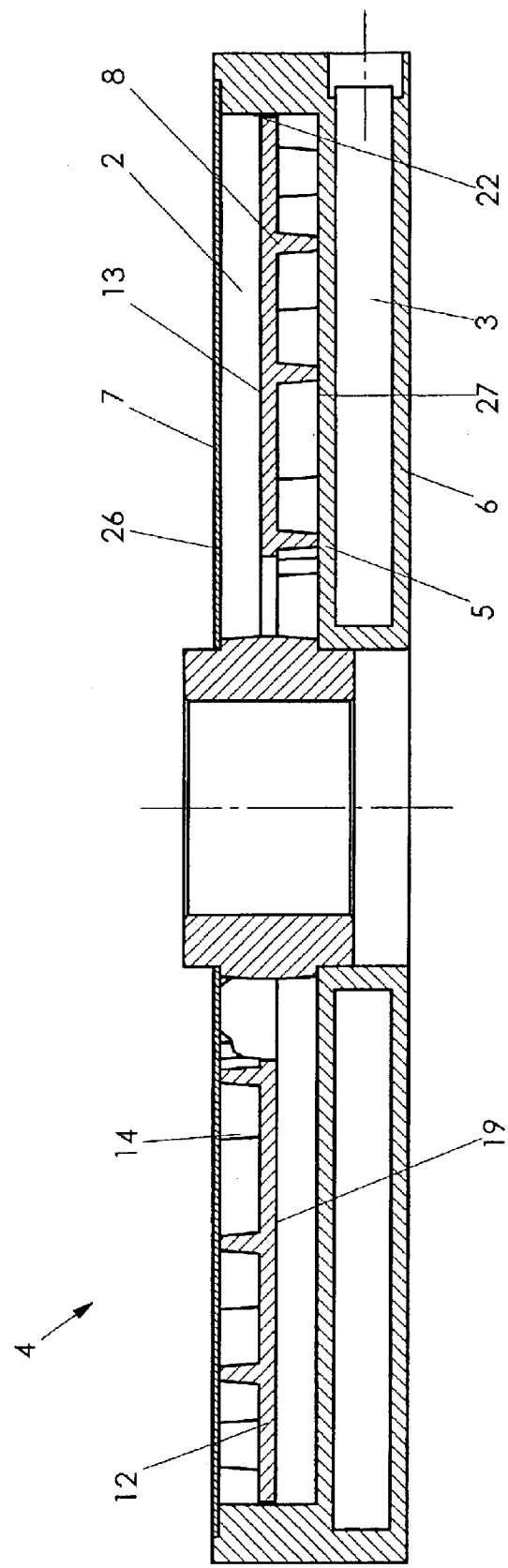
Figure 3:
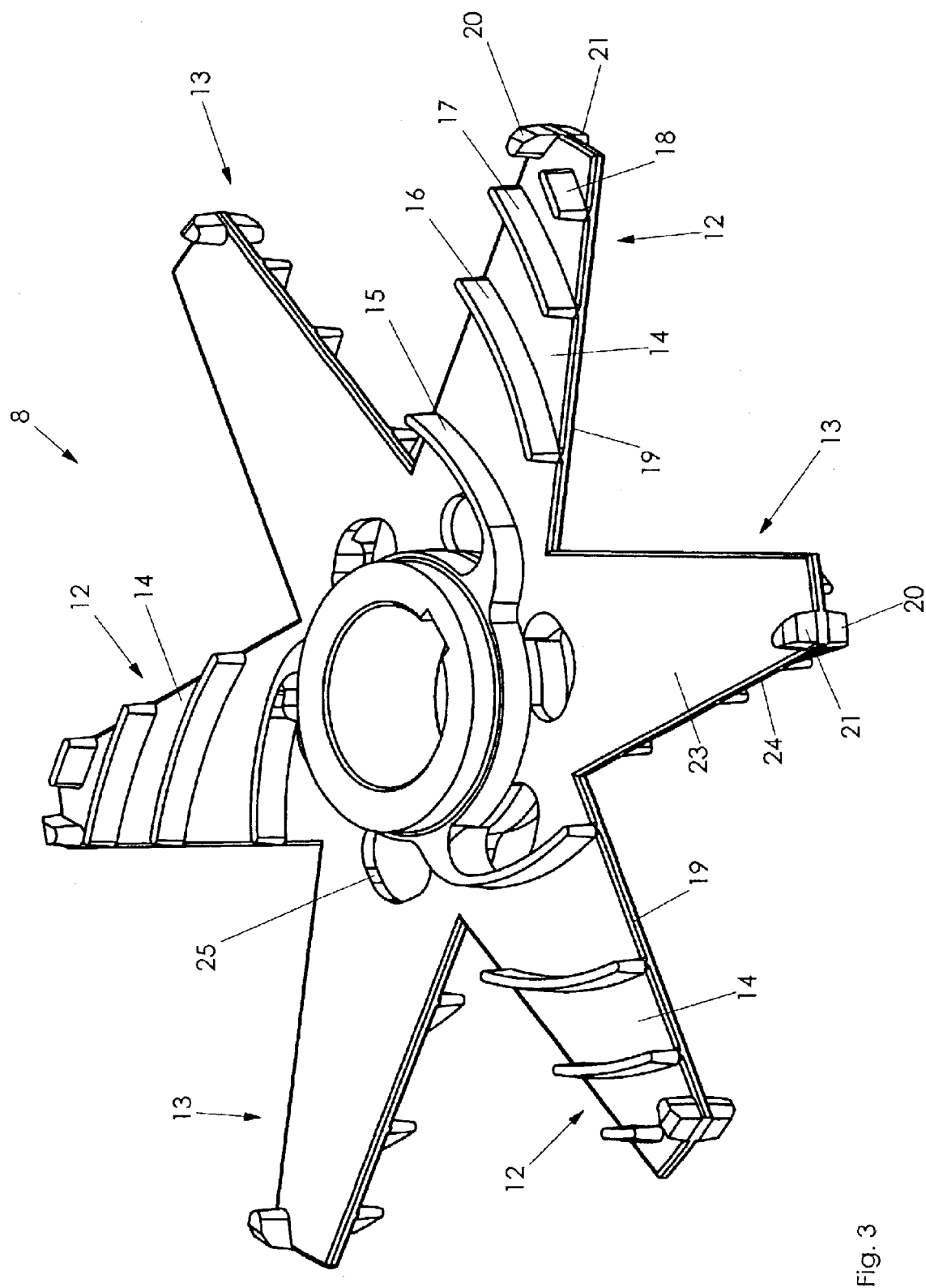
Figure 4:
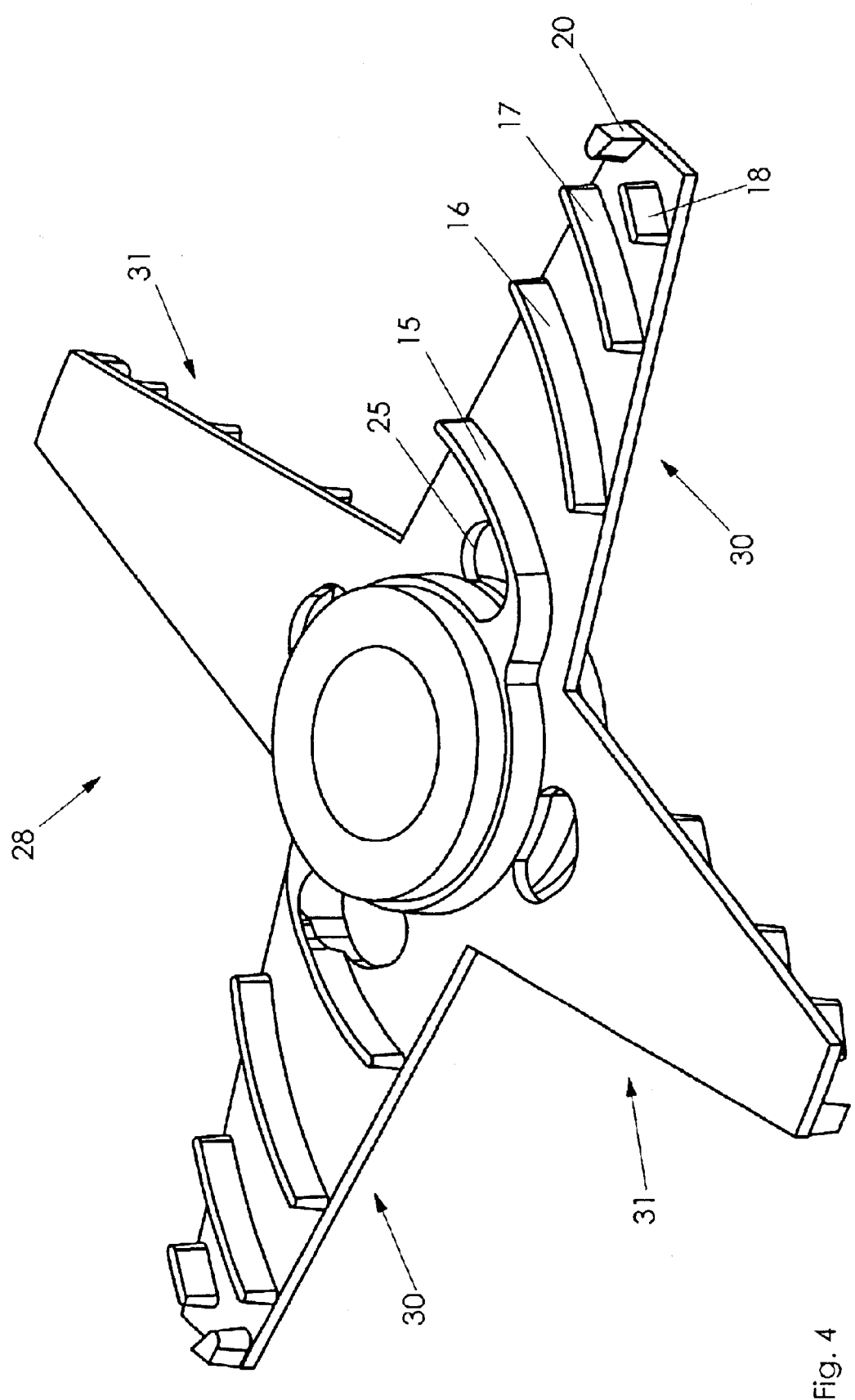
Figure 5:
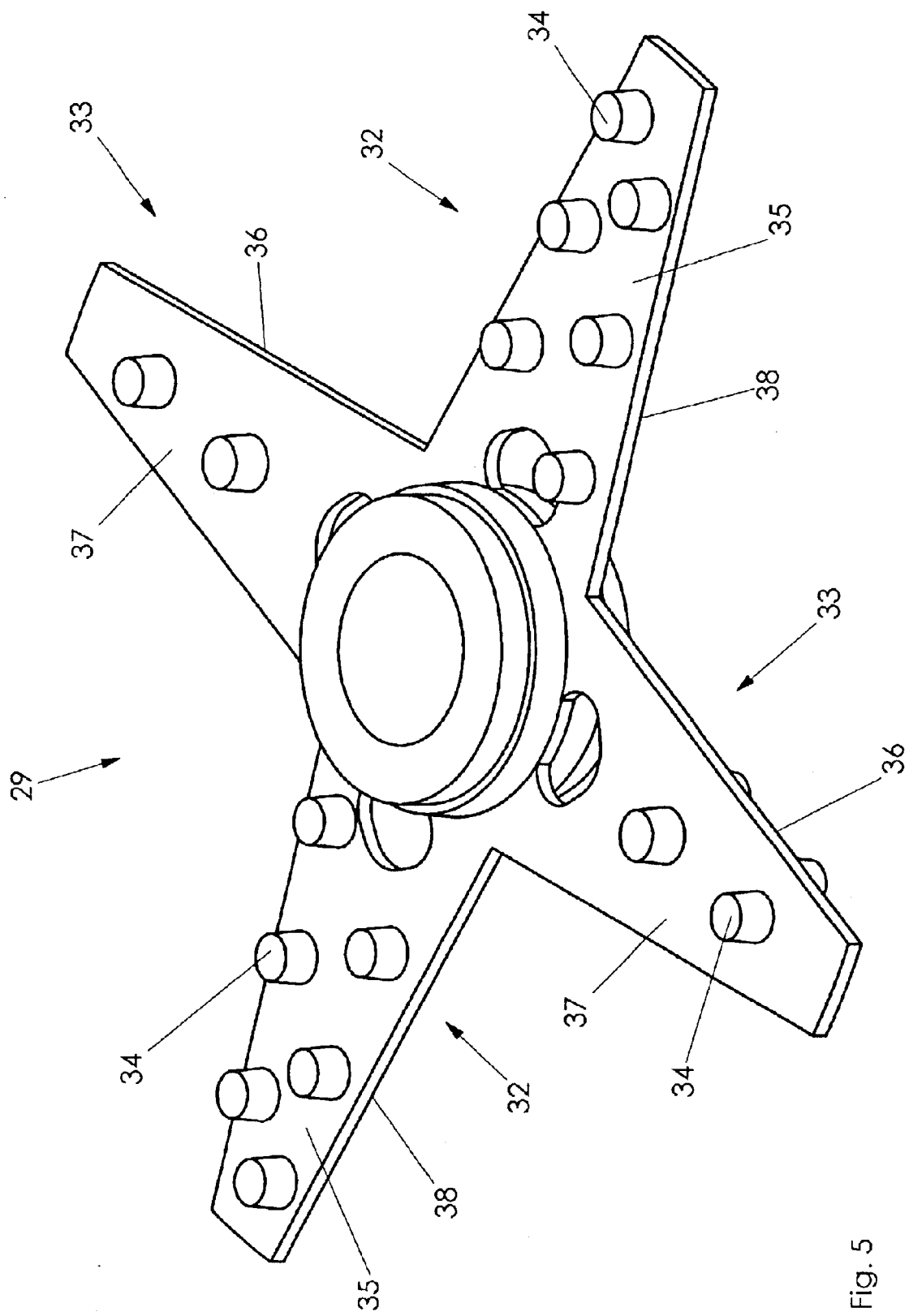

FIG. 1 schematically and in vertical section discloses a tempering apparatus in which the mass treatment chambers are arranged in a column with intermediary heat exchange chambers for throughflowing liquid, FIG. 2 discloses a schematical, vertical section of a mass treatment chamber comprising a mixing tool as in FIG. 1, FIG. 3 discloses a perspective view of the mixing tool according to the invention disclosed in FIG. 2 with six arms, FIG. 4 discloses a perspective view of a mixing tool with four arms, and FIG. 5 discloses a perspective view of a further mixing tool with four arms.

The tempering apparatus 1 disclosed in FIG. 1 comprises a number of round or disc-shaped mass treatment chambers 2 and intermediary water chambers 3 arranged in a column. As depicted in a greater enlargement in FIG. 2 may each mass treatment chamber 2 be joined with an underlying water chamber 3 to a separate disc-shaped unit 4. The units 4 are then arranged on top of each other and joined to a column as depicted in FIG. 1, and the capacity of the apparatus 1 is determined simply by the number of units 4 in the column. Heat exchange between the mass chambers 2 and the neighbouring water chambers 3 takes place through the disc-shaped walls 5 and 6, 7. The wall 7 may be omitted as the partitioning is then made by the wall 6 only being liquid-tight joined with the underlying unit 4 at the periphery and at the centre.

In each mass treatment chamber 2 is arranged a stirring tool 8, i.e. FIG. 2. The stirring tools 8 are all driven to rotation by a central shaft 9, which is driven by an electrical motor 10. The stirring tools are arranged vertically "floatable" on the shaft, so that they are able to move up and down a bit in the mass chamber, typically only 1–2 mm or less.

At the embodiment disclosed in FIG. 1 through-flow openings 11 for the mass to flow from one mass treatment chamber 2 and to the next chamber 2 in the column is arranged alternating at the periphery of the chambers 2. The through-flow openings may be arranged at other positions as well, and another typical position is as a ring-shaped opening extending around the shaft 9.

All of the water chambers 3 are connected to a water circuit, which for the sake of clarity is not disclosed as it doesn't perform part of the inventive idea. Water circuits is known in many configurations, however is that they are controllable, so that the desired tempering process can be performed up through the column, which the mass, and especially chocolate mass leaves having a content of stable β-crystals.

The stirring tools 8 comprise plate-shaped arms 12, 13 as disclosed in FIG. 2 and 3. By the most preferred embodiment disclosed in FIG. 3, is arranged six arms of which three arms 12 are similar and three intermediary arms 13 are similar as well. The upper side 14 of the plate-shaped arms 12 comprises mixing obstacles in the form of projecting mixing blades 15, 16, 17, 18, however the lower sides 19 are essentially free from mixing obstacles and thereby has a different geometrical configuration than the upper sides 14. The knobs 20, 21 at the end of the arms 12, 13 are not mixing obstacles as such but more serves to support the ends of the arms 12, 13 against severe vertical movements in the chambers 2. Furthermore, the knobs 20, 21 serves to take off the chocolate from the vertical, inner peripheral surface 22 of the mass chambers 2.

Each neighbouring plate-shaped arm 13 has the opposite geometrical configuration as that of the arms 12, so that the configuration of the upper side 23 of neighbouring arms 13 corresponds to the configuration of the lower side 19 of the arms 12, and the configuration of the lower side 24 of the arms 13 corresponds to the configuration of the upper side 14 of the arms 12. Arms having the configuration of the arm 12 is simply turned 180° or turned up-side down whereby the configuration of the arms 13 are obtained.

The mass is moved vertically up and down in the chamber in an intermittent sequence. The movements up and down of the mass works simultaneously with the radially forth and backwards mixing provided by the mixing blades 15,16, 17 and 18. The intermittent sequence of the vertically directed up- and downwardly directed flow of the mass highly effectively distributes the cold or heat from the heat exchange surfaces 26, 27 into the mass.

Tests have revealed an improvement of astonishing 30–60% in tempering capacity for the inventive solution in comparison with the traditional stirring tools with two or four plate-shaped arms. However, even more surprising were the results of comparative tests between the new stirring tools and a disc-shaped stirring tool of the previously described type. The capacity experienced by the new stirring tool disclosed in FIG. 3 was never lower than the capacity measured by the discs under the same conditions and by substitution of the tools in the same apparatus. The capacity was typically tested to be between 10 and 30% higher for the new stirring tool than for the known disc-shaped tool—and yet may the new apparatus be completely emptied from any mass and especially from highly viscous mass By different geometrical configuration is meant, that the shape of the one side 19 of an arm 12 secures a severely lower drag resistance or flow resistance through the mass, than the shape of the other side 14 of the arm 12. If mixing obstacles are provided on both sides of the arms the number of obstacles at the one side of the arm shall be much lesser than at the other side. At the one side may for example be arranged two obstacles and at the other side may be arranged 4–10 obstacles. The obstacles could for example be essentially identical mixing blades at both sides of the arm or identical mixing knobs at both sides of the arm. The drag resistance may also be reduces severely if the shape or configuration of the obstacles at the one side is altered, for example by reducing the width of the obstacles drastically in comparison with the width of the obstacles at the other side of the arms. Optional is when the one side is essentially free from mixing obstacles and the other side comprises 3–6 mixing obstacles Decisive for obtaining different geometrical configuration of the two sides of the arms is then that a different resistance in the mass flow is achieved. When a pressure difference between the two sides is created, the mass is influenced to the intermittent up-and down movements behind the trailing edge of an arm. This movement or flow characteristic can easily be acknowledged by a 3D computer simulation or by a "live" test in which easily detected particles are observed in the mass chambers. The mass may be substituted by a transparent liquid with viscosity much like that of the mass to be tempered, such as chocolate mass. Parts of the test apparatus and the mass chambers is then transparent as well.

The rotation of the shaft 9 could also be raised in comparison with the stirring tools having only two arms. Apparently, the much better mixing in the inventive apparatus gives the possibility of a higher "sweeping" frequency of the arms over the heat exchange surfaces 26, 27 than by the prior known stirring tools with arms.

Close to the shaft may be arranged openings 25 in the arms 12, 13 for through flow of the mass and for creating a better mixing of the mass close around the shaft 9. The arms 12, 13 are arranged essentially in the middle between the upper heat exchange surfaces 26 and the lower surfaces 27, i.e. FIG. 2.

The embodiments of the stirring tools 28 and 29 disclosed in FIGS. 4 and 5 both comprises four plate-shaped arms. The arms 30 and 31 of the stirring tool 28 are close to be identical to the arms 12, 13 of the stirring tool 8 disclosed in FIG. 3. The only difference is, that the knobs 21 are omitted.

By the embodiment 29 disclosed in FIG. 5 the arms 32 and 33 comprises mixing knobs 34. At the upper side 35 of the arms 32 and at the lower sides 36 of the arms 33 are arranged six mixing knobs 34 evenly distributed along the arms. At the other sides of the arms, i.e. the upper sides 37 of the arms 33 and the lower sides 38 of the arms 32, are arranged only two mixing knobs 34 so that the drag or flow resistance to the mass is severely reduced in comparison to the sides having a plurality of knobs. The intermittent up- and downwards movement of the mass is experienced and the improved capacity is obtained.

What is claimed is:

1. A tempering apparatus comprising:
   a mass treatment chamber;
   a stirring tool within the chamber, the stirring tool including a central shaft disposed to rotate the tool, a hub affixed to the shaft, and a plurality of plate-like arms extending radially from the hub, wherein each of the plurality of plate-like arms has an upper surface and a lower surface, one surface having at least one protrusion disposed thereon,
   wherein opposite surfaces of one plate-like arm have different geometric configurations, and
   wherein opposite surfaces of radially adjacent plate-like arms have substantially the same geometric configuration.

2. The tempering apparatus of claim 1, wherein the at least one protrusion is disposed on one surface of each of the plurality of plate-like arms.

3. The tempering apparatus of claim 2, wherein the opposite surface of the surface having the at least one protrusion thereon has no protrusions.

4. The tempering apparatus of claim 1, wherein the mass treatment chamber includes heat exchangers disposed between the stirring tools, with the surfaces of the heat exchangers being substantially parallel to the surfaces of the plurality of plate-like arms.

5. The tempering apparatus of claim 1, wherein the mass treatment chamber includes radially disposed heat exchangers having surfaces substantially parallel to the plurality of plate-like arms, with at least one surface of the heat exchanger disposed to contact the protrusions on at least one of the plate-like arms.

6. The tempering apparatus of claim 1, wherein the plurality of plate-like arms extending radially from the hub number four.

7. The tempering apparatus of claim 1, wherein the plurality of plate-like arms extending radially from the hub number six.

8. The tempering apparatus of claim 1, wherein the protrusions comprise blades projecting from at least one surface of each of the plurality of plate-like arms.

9. The tempering apparatus of claim 8, wherein the blades are curved.

10. The tempering apparatus of claim 8, wherein the blades are configured so as to force the mass radially outward away from the center of the stirring tool.

11. The tempering apparatus of claim 8, wherein the blades are configured so as to force the mass radially inward towards the center of the stirring tool.

12. An apparatus for continuous tempering of a fat containing mass, the apparatus comprising:
at least one mass treatment chamber;
a stirring tool within the chamber, the stirring tool including a hub disposed to rotate the tool within the chamber,
a plurality of plate-like arms extending radially from the hub, each of the plate-like arms having a plurality of protrusions disposed thereon, the protrusions on opposite sides of each such plate-like arm being disposed to produce differential pressure across the thickness of the plate-like arms; and
at least one heat exchanger within the chamber.

13. The tempering apparatus of claim 12, wherein the plurality of protrusions are disposed only on one side of each of the plate-like arms.

14. The tempering apparatus of claim 13, wherein the plate-like arms include openings therethrough disposed to allow axial flow of the mass through the plate-like arms.

15. The tempering apparatus of claim 12, including at least one heat exchanger having surfaces substantially parallel to the plate-like arms.

16. The tempering apparatus of claim 15, wherein the mass treatment chamber includes a plurality of heat exchangers disposed between a plurality of plate-like arms, the protrusion on the plate-like arms contacting the surface of an axially adjacent heat exchanger.

17. The tempering apparatus of claim 12, wherein the protrusions comprise a plurality of blades.

18. The tempering apparatus of claim 17, wherein the blades are curved.

19. The tempering apparatus of claim 17, wherein the mass treatment chamber includes a plurality of heat exchangers disposed between a plurality of plate-like arms, the blades on the plate-like arms contacting the surface of an axially adjacent heat exchanger.

20. The tempering apparatus of claim 12, wherein the protrusions comprise a plurality of truncated cylinders.

21. The tempering apparatus of claim 20, wherein the mass treatment chamber includes a plurality of heat exchangers disposed between a plurality of plate-like arms, the plurality of truncated cylinders on the plate-like arms contacting the surface of an axially adjacent heat exchanger.

22. The tempering apparatus of claim 21, wherein the plurality of truncated cylinders on the plate-like arms are tapered in the axial direction.

23. An apparatus for continuous tempering of a mass comprising chocolate, the apparatus comprising:
at least one mass treatment chamber;
a stirring tool within the chamber, the stirring tool including a hub disposed to rotate the tool within the chamber,
a plurality of plate-like arms extending radially from the hub, each of the plate-like arms having a plurality of protrusions disposed thereon, the protrusions on opposite sides of each such plate-like arm being disposed to produce differential pressure across the thickness of the plate-like arms, the plate-like arms including openings therethrough disposed to allow axial flow of the mass through the plate-like arms; and
at least one heat exchanger having surfaces substantially parallel to the plate-like arms within the chamber, the protrusions being in contact with the surface of a radially adjacent heat exchanger.

24. The tempering apparatus of claim 23, wherein the plurality of protrusions are disposed on only one side of each of the plate-like arms.

25. The tempering apparatus of claim 24, wherein the protrusions comprise blade-like members.

26. The tempering apparatus of claim 25, wherein the blade-like members are curved.

27. The tempering apparatus of claim 26, wherein the curved blade-like members induce flow in the radial direction.

28. The tempering apparatus of claim 27, wherein the induced radial flow is primarily toward the hub.

29. The tempering apparatus of claim 28, wherein the openings in the plate-like members are adjacent the hub.

30. The tempering apparatus of claim 27, wherein the induced radial flow is primarily away from the hub.

* * * * *